United States Patent [19]
Mishina et al.

[11] Patent Number: 5,146,694
[45] Date of Patent: Sep. 15, 1992

[54] VAPOR REFLOW TYPE SOLDERING APPARATUS

[75] Inventors: Haruo Mishina, Ushiku; Shinya Yamama, Abiko, both of Japan

[73] Assignee: Hitachi Techno Engineering Co., Ltd., Tokyo, Japan

[21] Appl. No.: 591,884

[22] Filed: Oct. 2, 1990

[30] Foreign Application Priority Data

Oct. 3, 1989 [JP] Japan .................. 1-257036

[51] Int. Cl.⁵ .......................................... F26B 21/06
[52] U.S. Cl. ....................................... 34/78; 432/194; 118/729; 118/61
[58] Field of Search .................. 34/77, 78, 79, 73, 74; 134/11; 432/194, 197; 118/729, 61

[56] References Cited

U.S. PATENT DOCUMENTS

| | | | |
|---|---|---|---|
| 4,291,471 | 9/1981 | Bloom | 34/151 |
| 4,361,967 | 12/1982 | Bahnsen et al. | 34/151 |
| 4,389,797 | 6/1983 | Spigarelli et al. | 34/78 |
| 4,628,616 | 12/1986 | Shirai et al. | 134/11 |
| 4,735,001 | 4/1988 | Mishina et al. | 34/78 |
| 4,776,105 | 10/1988 | Mishina et al. | 34/78 |
| 4,996,781 | 3/1991 | Mishina et al. | 34/78 |

*Primary Examiner*—Henry A. Bennet
*Assistant Examiner*—Denise L. F. Gromada
*Attorney, Agent, or Firm*—Antonelli, Terry, Stout & Kraus

[57] ABSTRACT

A vapor reflow type soldering apparatus with an upper supply hole of vapor for heating the upper surface of an article to be processed, the position of which is displaced to the downstream side along a direction of delivery with respect to that of a lower supply hole of vapor for heating the lower surface of the article, so that the temperature of the upper surface of the article to be processed can be raised more moderately than that of the lower surface thereof.

4 Claims, 9 Drawing Sheets

VAPOR REFLOW TYPE SOLDERING APPARATUS

BACKGROUND OF THE INVENTION

The present invention relates to a vapor reflow type soldering apparatus wherein an article to be processed on which paste of soldering material is printed is subjected to vapor of a thermal medium and heated to melt the soldering material while being delivered by a conveyor and, more particularly, to an improved vapor reflow type soldering apparatus for soldering works of printed circuit boards carrying electronic parts thereon.

A technique of the aforementioned type as disclosed in, for example, Japanese Patent Unexamined Publication Nos. 60-106502 and 63-90362.

These conventional vapor reflow type soldering apparatus involve the following problems:

a) If a printed board carrying electronic parts thereon is to be processed, the temperature of the board exposed to saturated vapor of a thermal medium will be drastically increased because the condensation heat transfer rate of the thermal medium is extremely high. However, the temperatures of members of small heat capacities such as, for example, electrodes of small-sized chips and IC leads, will be raised even more drastically in comparison with the temperature of the printed wiring board. As a result, problems arise with respect to soldering operation such as tombstone effect of chips and wicking effect by molten soldering material, thereby degrading the reliability of the soldering works.

b) In order to prevent the above-described troubles in relation to soldering works, it is known that the printed wiring board of a relatively large heat capacity is heated from the lower surface thereof so that the temperatures of the chip electrodes and IC leads can later be raised through heat transfer. In this case, however, a problem arises in that the configuration and size of a lower vapor supply hole becomes very large. Besides, if the above-mentioned board is packaged on both sides, parts carried on the lower surface thereof will be exposed to the thermal medium vapor for a long period of time, thus resulting in a problem concerning heat resistance of the parts.

Other improvements of a soldering apparatus of this type have been proposed in the U.S. patent application Ser. Nos. 425,025 (on Oct. 23, 1989) and 426,434 (on Oct. 25, 1989).

SUMMARY OF THE INVENTION

An object of the present invention is to provide a vapor reflow type soldering apparatus which does not create problems in soldering operations such as tombstone effect of chips and wicking effect by molten soldering material; the size of which need not be extremely large as a whole; and which does not cause electronic parts carried on an article to be processed to have a problem concerning the heat resistance.

The vapor reflow type soldering apparatus according to the invention comprises a vapor generating tank in which vapor of a thermal medium is generated by heating the thermal medium; a conveyor for delivering an article to be processed while passing through the vapor generating tank; a lower vapor supply hole through which the thermal medium vapor generated in the vapor generating tank is introduced to the lower surface of the article to be processed; and an upper vapor supply hole through which the thermal medium vapor is likewise introduced to the upper surface of the article to be processed, wherein the position of the upper vapor supply hole is relatively deviated in a direction of delivery of the conveyor with respect to the position of the lower vapor supply hole, so that the temperature of the upper surface of the article to be processed is raised more moderately than that of the lower surface thereof.

In the present invention, the expression "the conveyor passing through the vapor generating tank" is used either in a sense that a delivery path of the conveyor extends through the vapor generating tank or in a sense that a delivery path of the conveyor is located adjacent to the vapor generating tank.

In practice of the present invention, a flow controlling member is preferably provided on the upper vapor supply hole so as to cause the supplied vapor to have a direction inclined toward the downstream side along the direction of delivery of the conveyor with respect to a direction perpendicular to the direction of delivery.

Further, in accordance with the invention, the upper vapor supply hole is preferably provided with an openable/closable cover so as to control the flow rate of the vapor.

According to further features of the invention, the upper vapor supply hole is preferably arranged to occupy different positions. In this case, the entire upper vapor supply hole need not be displaced, but its starting line, i.e., the upstream end with respect to the direction of delivery of the conveyor, may be moved in the direction of delivery of the conveyor.

As described above, when the upper vapor supply hole is displaced more specifically, when it is displaced to the downstream side along the delivery direction of the conveyor in comparison with the lower vapor supply hole, if the article to be processed is, for example, an electric circuit board, the printed circuit board of a relatively large heat capacity is first heated by the thermal medium vapor supplied from the lower vapor supply hole. Part of this heat is transferred to chip electrodes and IC leads, gradually raising their temperatures.

After that, these chip electrodes and IC leads are heated to a saturation temperature by the thermal medium vapor supplied from the upper vapor supply hole. In this manner, unbalance of temperature increases of the heated parts due to differences of their heat capacities can be corrected to prevent the soldered parts from being deficient.

In this case, if the flow direction of the vapor supplied from the upper vapor supply hole is inclined to the upstream side along the delivery direction of the conveyor in comparison with a direction perpendicular to the delivery direction, none of the thermal medium vapor will unfavorably enter an inlet-side delivery path, thereby facilitating accurate temperature controls.

Moreover, in this case, when the upper vapor supply hole is provided with an openable/closable cover so as to control the flow rate of the vapor, soldering works can be accomplished under the optimum conditions by simple adjustments even if the article to be processed is of a different arrangement.

Furthermore, if the upper vapor supply hole has such a structure that its position, especially, the position of the upstream end with respect to the delivery direction, can be controlled, it is more convenient when performing soldering works under the optimum conditions in accordance with different arrangements of the article to be processed.

BRIEF DESCRIPTION OF THE DRAWINGS

FIG. 1A is a schematic cross-sectional view of the vapor reflow soldering type apparatus taken along the line IA—IA in FIG. 1;

DESCRIPTION OF THE PREFERRED EMBODIMENTS

Figure 1:
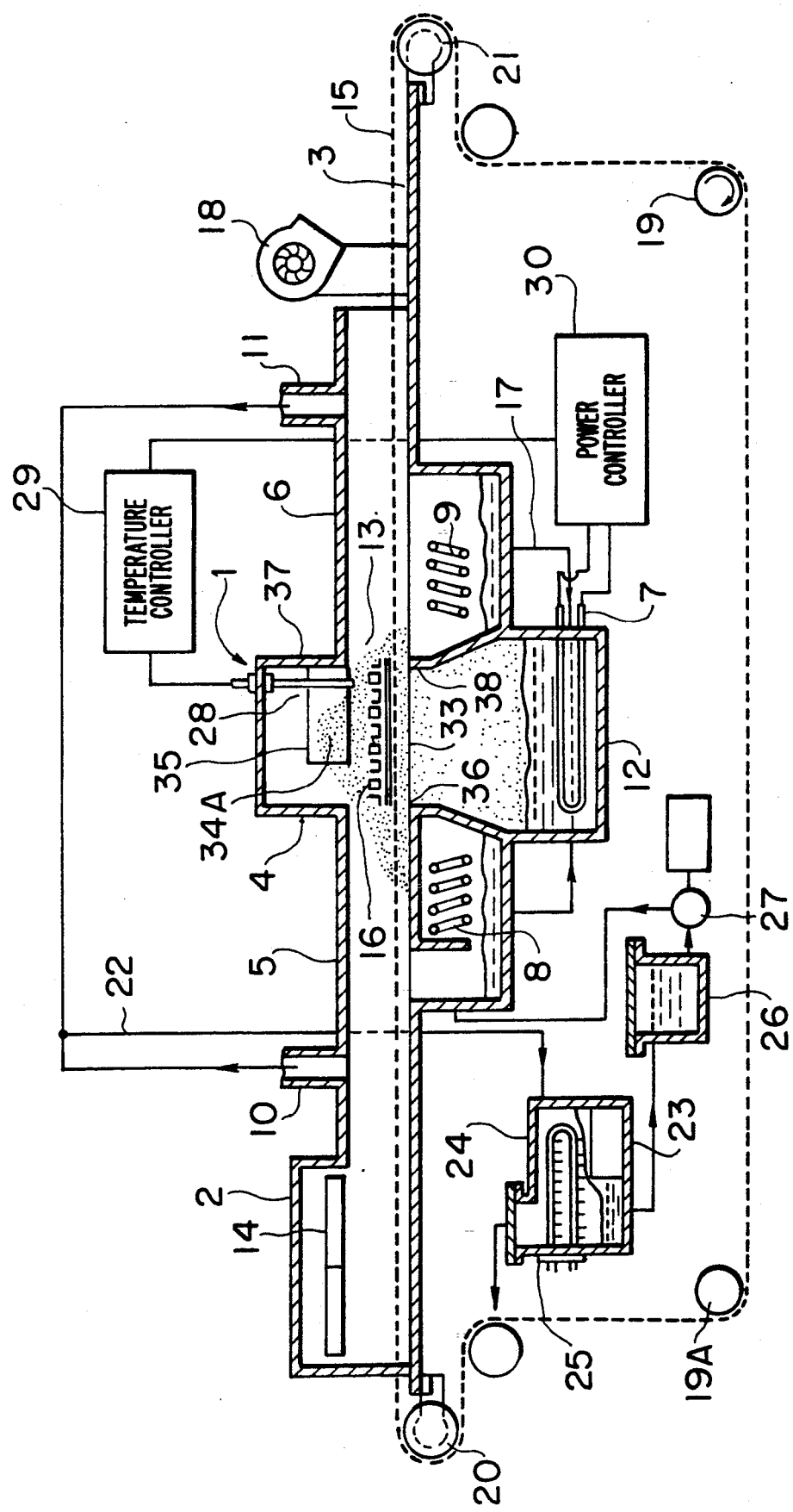
FIG. 1 is a schematic cross-sectional view of a vapor reflow type soldering apparatus according to one embodiment of the present invention.

Referring to FIG. 1, a reflow chamber 1 includes a vapor generating tank 4, an inlet-side delivery path 5, an outlet-side delivery path 6, a thermal medium heater 7 for heating a liquidfied thermal medium 12, an inlet-side cooling unit 8, an outlet-side cooling unit 9, an inlet-side discharge port 10, and an outlet-side discharge port 11. A preheating chamber 2 is provided for an article 16 to be solder-processed, with the preheating chamber 2 being provided with a preheater 14. A cooling section 3 is provided for the solder-processed article 16, with the cooling section 3 including a cooling fan 18. A conveyor 15, provided with idler sprocket wheels 19A, 20, 21, and drive sprocket wheels 19, delivers the article 16 horizontally from the left to the right in the drawing. Collecting means 23 and a water/acid remover 26 are also provided.

In the vapor reflow type soldering apparatus constructed in the above-described manner, the thermal medium heater 7 is operated to heat the liquefied thermal medium 12, stagnant in a bottom portion of the vapor generating tank 4, so as to boil and vaporize the thermal medium. Then, saturated vapor 13 of the thermal medium 12 is raised upwardly through side wall conduits 31 (FIG. 1A), and is supplied from an upper vapor supply hole 34A and a lower vapor supply hole 33 toward the article to be 16, thereby heating the upper and lower surfaces of the article 16. After heating the article 16, part of the thermal medium vapor is liquefied to fall downwardly, and is returned back to the bottom portion of the vapor generating tank.

The saturated vapor 13 which has been introduced into the inlet-side delivery path 5 and the outlet-side delivery path 6 is cooled to be liquefied in the inlet-side cooling unit 8 and the outlet-side cooling unit 9, and is returned through return pipes 17 back to the bottom portion of the vapor generating tank 4.

The rest of the vapor flowing out of the inlet-side discharge port 10 and the outlet-side discharge port 11 is introduced through pipes 22 into the collecting means 23, and is collected by a demister 25 provided with a cooling coil 24.

Water/acid of the collected thermal medium is removed by the water/acid remover 26, and is returned back to the vapor generating tank 4 by a pump 27.

On the other hand, while the article 16 is delivered by the conveyor 15, it is preheated in the preheating chamber 2 by the preheater 14, and is heated in the reflow chamber 1 by the saturated vapor 13 of the thermal medium in contact therewith, thus melting soldering material printed on the article 16.

The article 16 is gradually cooled while passing through the outlet-side delivery path 6, and is forcibly cooled in the cooling section 3 where the soldering material is solidified to complete the soldering process.

The temperature of the saturated vapor 13 in the vapor generating tank 4 is detected by a temperature sensor 28, and a power controller 30 is controlled by a temperature controller 29 so as to maintain the saturated vapor 13 at a predetermined temperature.

When the article 16 is delivered toward the right in the drawing, the lower surface thereof will not be exposed to a flow of the vapor until it reaches the left end 36 of the lower vapor supply hole 33, i.e., the upstream end of the same with respect to the delivery direction. For convenience sake, the upstream end of the supply hole with respect to the delivery direction is referred to as the starting line.

On the other hand, reference numeral 38 denotes an ending line of the lower vapor supply hole 33, the downstream end of the same with respect to the delivery direction.

An upper vapor supply hole 34A includes a starting line 35 and an ending line 37, with the starting line 35 to the right, i.e., in the delivery direction with respect to the starting line 36 of the lower vapor supply hole 33.

As a result, a member on the upper surface of the article to be processed, for example, an IC chip begins to be exposed to the thermal medium vapor later than a member on the lower surface thereof, for example, a printed board, and increase of its temperature is accordingly delayed.

Figure 2:
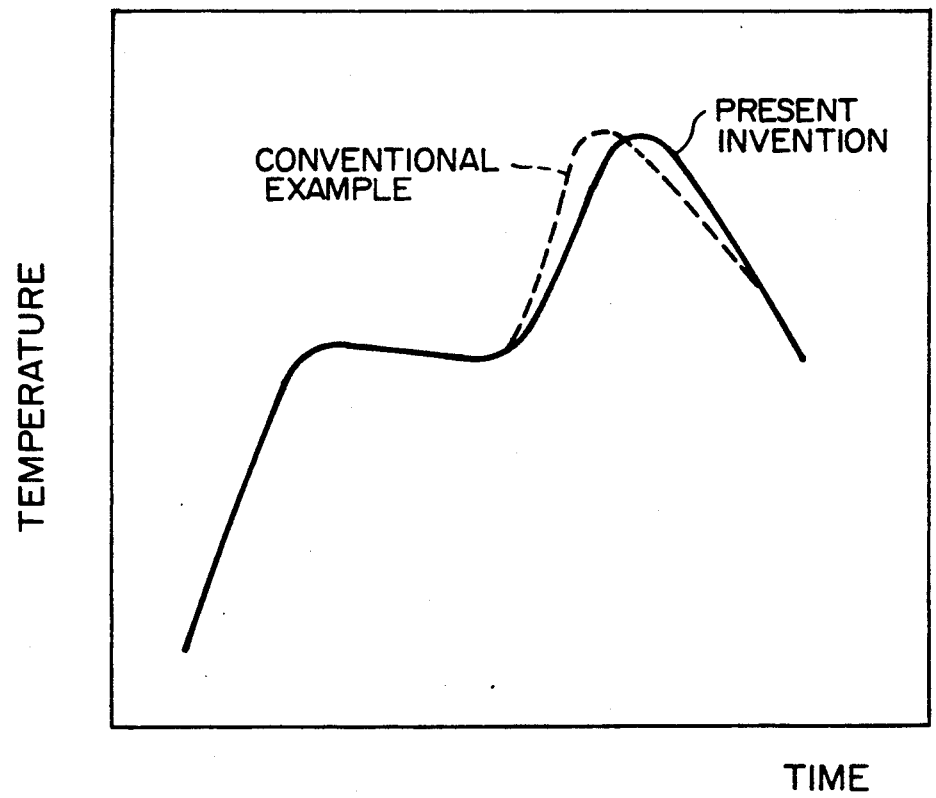
FIG. 2 is a graph illustrating temperature change in the above-mentioned embodiment.

FIG. 2 is a graph in which temperature change of an electrode of a chip part when a printed board carrying chip parts thereon is processed for soldering by the apparatus according to the embodiment shown in FIG. 1 is depicted by a solid line in comparison with temperature change of its equivalent in a conventional example shown in FIG. 11 (a dashed line).

It can be understood from the graph that the temperature of the electrode of the chip part according to this embodiment is increased more moderately.

Figure 3:
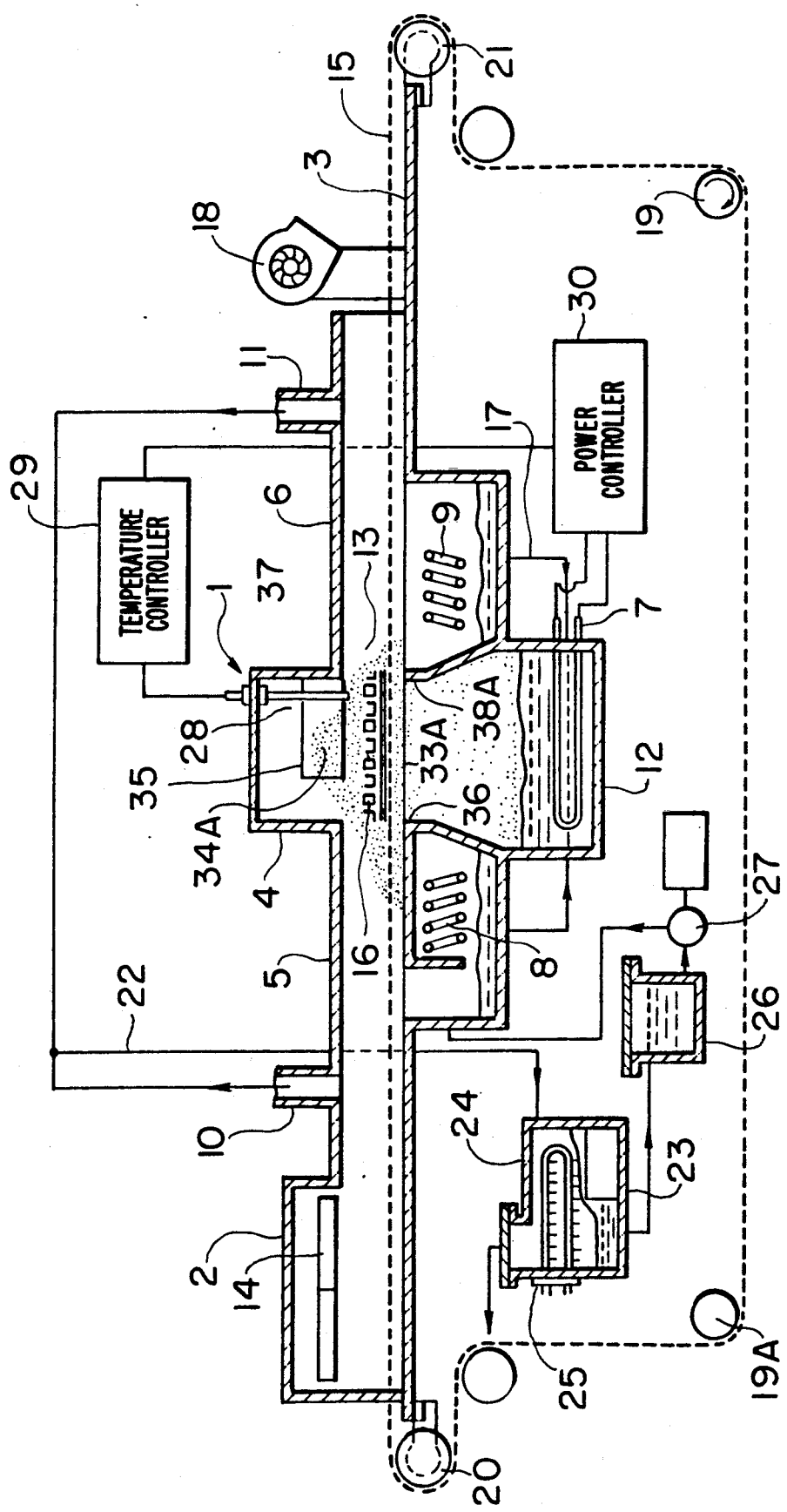
FIGS. 3 and 4 are schematic cross-sectional views of different embodiments from the above-mentioned one.

The embodiment of FIG. 3 differs from the embodiment of FIG. 1 in that an ending line 38A of a lower vapor supply hole is displaced to the left in the drawing, i.e., in a direction opposite to the delivery direction. In this embodiment, the temperature of the upper surface member of the article to be processed can be likewise increased more moderately in comparison with that of the lower surface member thereof. It can be also arranged in the present embodiment that the lower surface member of the article 16 passes the lower vapor supply hole 33A for the same length of time as it passes the upper vapor supply hole 34.

Figure 4:
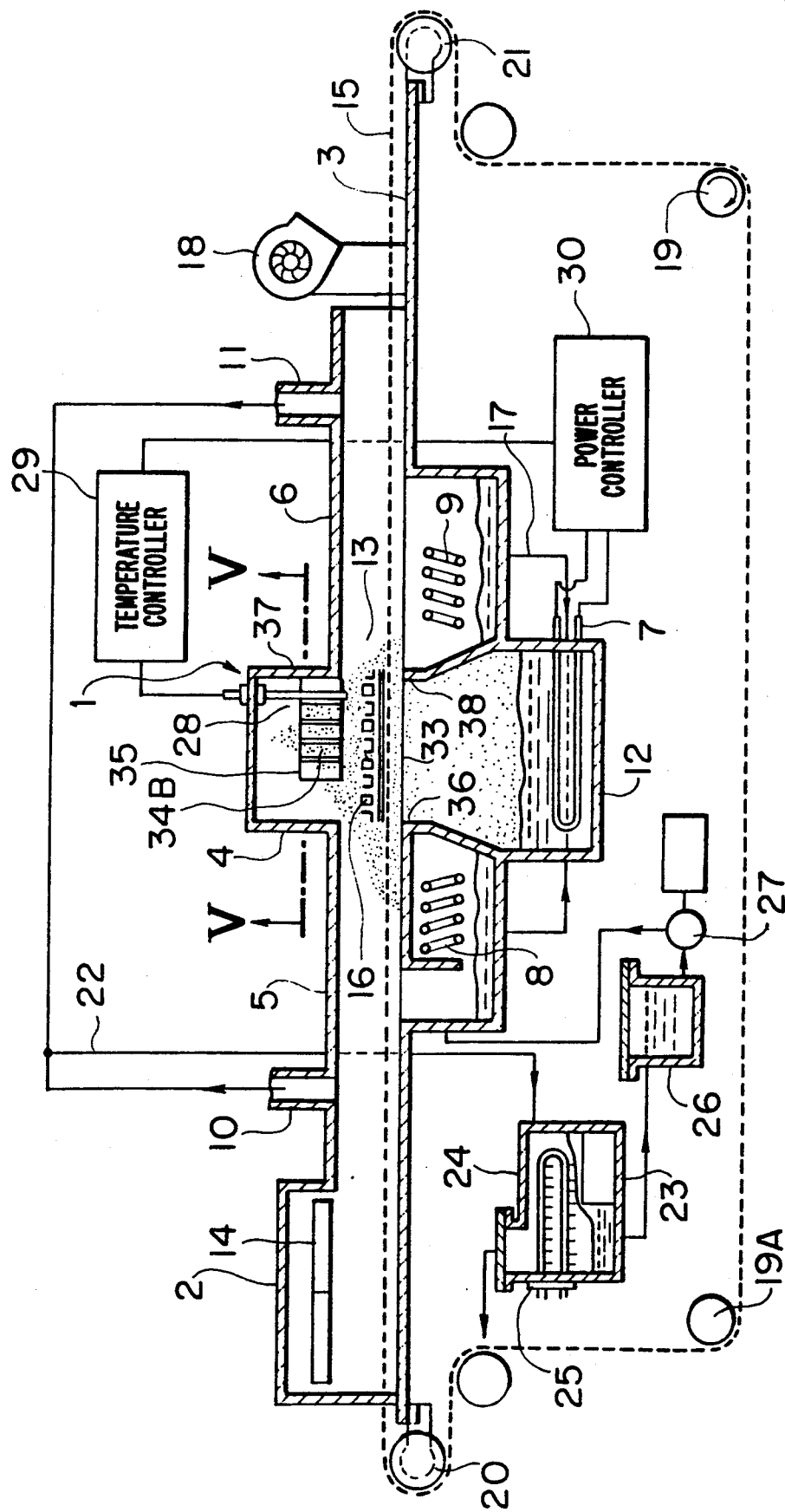
Figure 5:
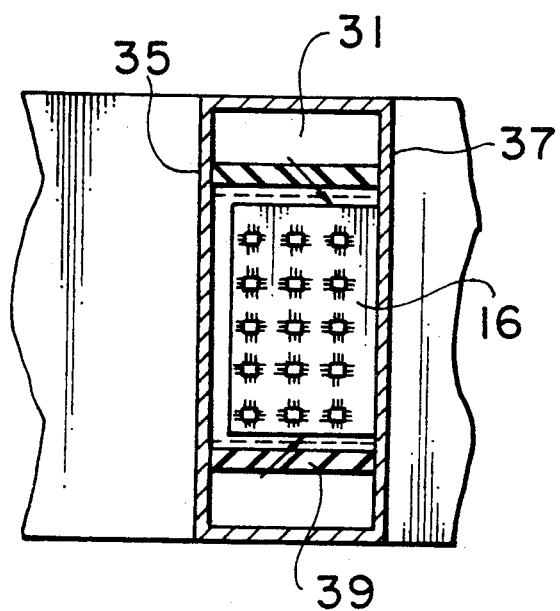
FIG. 5 is a cross-sectional view of the embodiment shown in FIG. 4 taken along the line V—V, as viewed in a direction of the arrows.

An upper vapor supply hole 34B of the embodiment of FIGS. 4 and 5 is provided with louvers 39 for controlling a flow of the vapor, as shown in FIG. 5, so that the supplied vapor flow can be directed to the right in FIG. 4, i.e., toward the downstream side with respect to the delivery direction.

As a result, there remains no fear that the thermal medium vapor will leak toward the inlet-side delivery path 5, thus ensuring the effect that the upper vapor supply hole 34B is deviated in the delivery direction.

Figure 7:
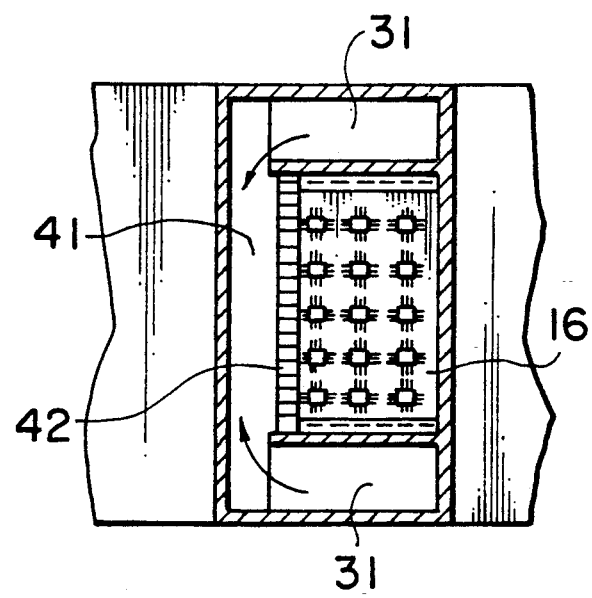
FIG. 7 is a cross-sectional view of the embodiment shown in FIG. 6 taken along the line VII—VII, as viewed in a direction of the arrows.
Figure 6:
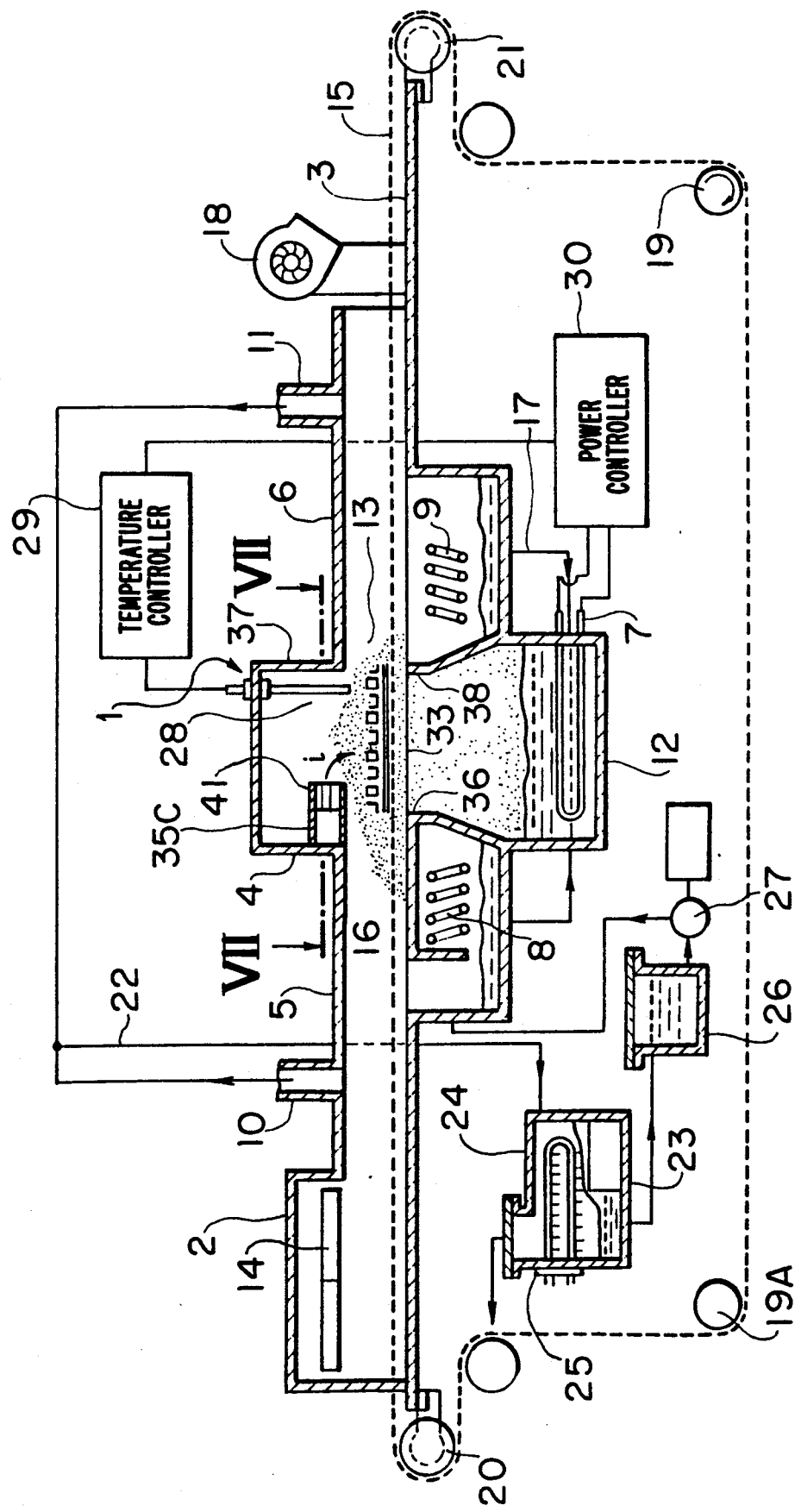
FIG. 6 is a schematic cross-sectional view of another embodiment different from the above-mentioned ones.

In the embodiment of FIGS. 6 and 7, the thermal medium vapor is guided toward an inlet-side ceiling section through side wall conduits 31 (FIG. 7) formed in side walls of the delivery path, and is supplied from a flow controlling lattice 42 toward the upper surface of the article 16. Here, the vapor is supplied in a direction of the arrow i which is inclined to the delivery direction, that is, to the right in FIG. 6, rather than a direction perpendicular to the delivery direction.

The thermal medium vapor is raised through a pair of side wall conduits 31 shown in FIG. 7, along a direction perpendicular to the plane of the sheet of the drawing, and these two vapor flows are mixed at an upper conduit 41. Then, the vapor is supplied from the flow controlling lattice 42 toward the upper surface of the article to be processed 16. In this manner, the effect of delaying the temperature increase of the upper surface of the article 16 in comparison with that of the lower surface of the same can be further enhanced.

Figure 8:
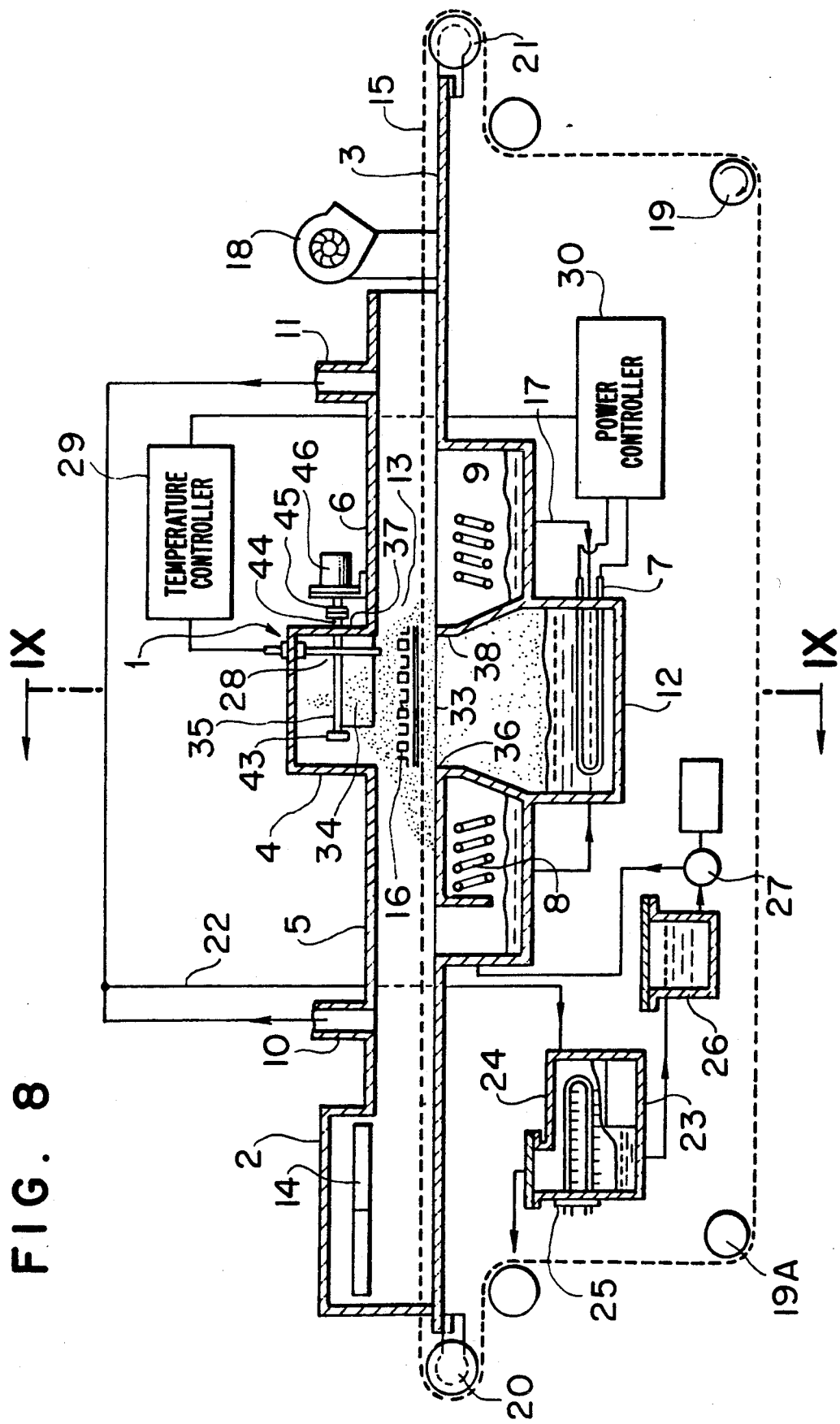
FIG. 8 is a schematic cross-sectional view of a still other embodiment than the above-mentioned ones.
Figure 9:
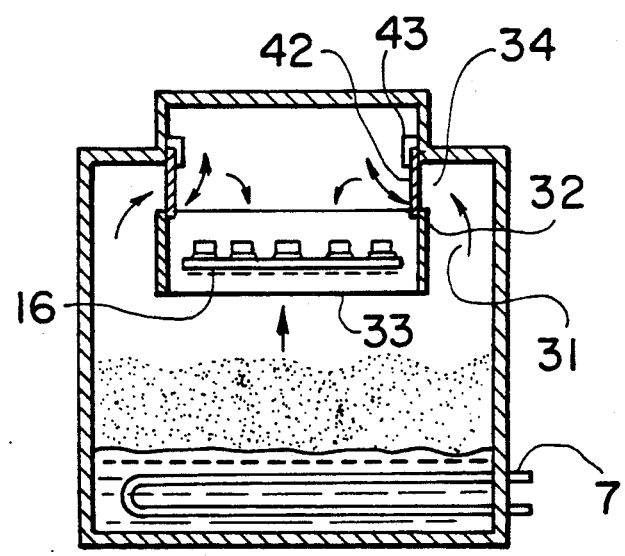
FIG. 9 is a cross-sectional view of the embodiment shown in FIG. 8 taken along the line IX—IX, as viewed in a direction of the arrows.

In the embodiment of FIGS. 8 and 9, there are provided a cover 42 for the upper vapor supply hole, a drive shaft 44 securely fixed on the cover 42, a bearing 43 for the shaft 44, and a motor 46 connected with the drive shaft 44 through a coupling 45.

The temperature increase of the article 16 is determined in accordance with heat capacities of parts which constitute the article 16. Consequently, if the article 16 is of a different arrangement to change the heat capacities of the constituent parts, the motor 46 is activated to open/close the cover 42. With an appropriate timing and a proper degree of this opening/closing operation, each soldering process of articles of various arrangements can be accomplished under the optimum conditions.

Figure 10:
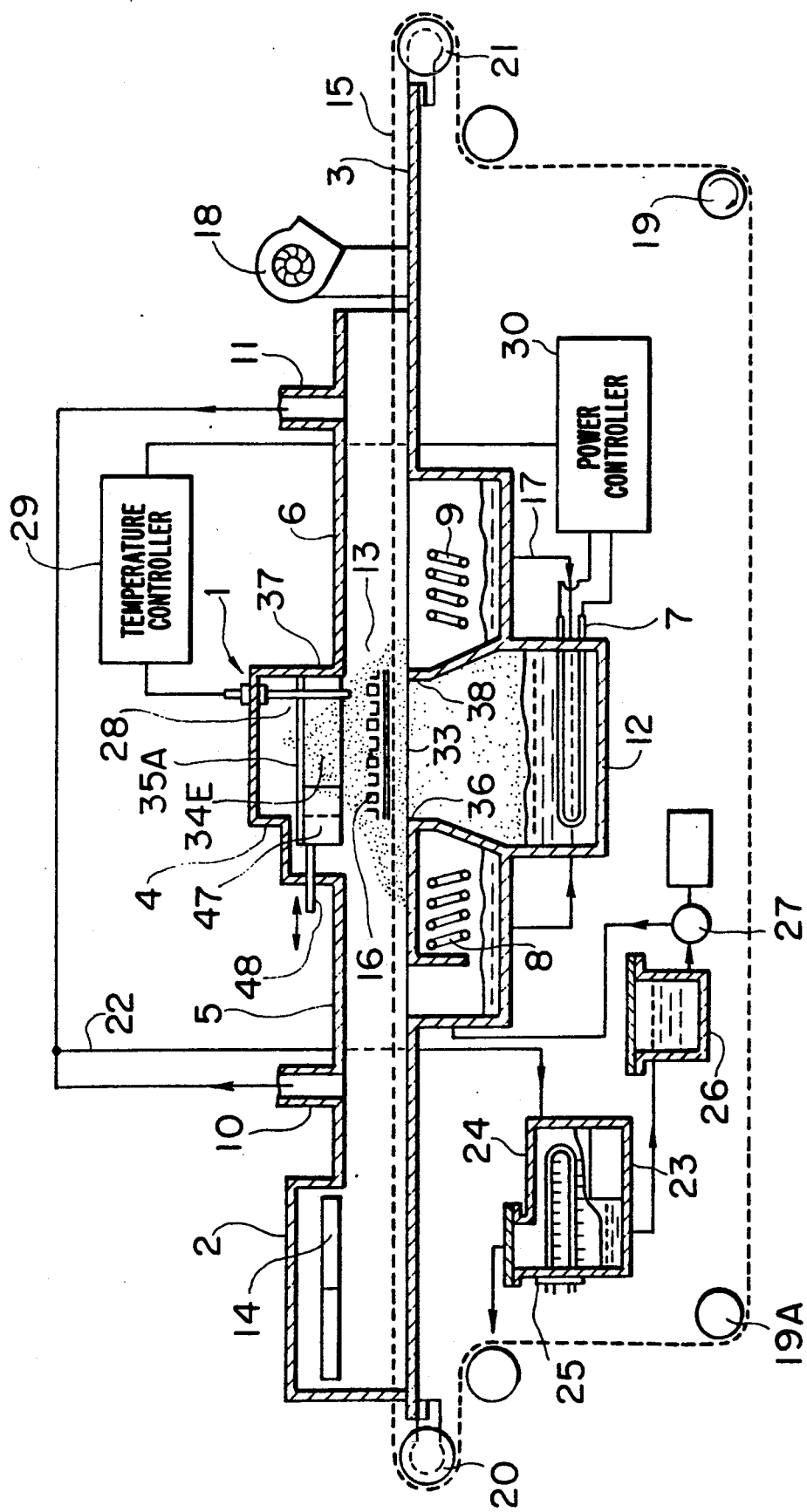
FIG. 10 is a schematic cross-sectional view of a further embodiment different from the above-mentioned ones.

In the embodiment of FIG. 10, there are provided a slide-type cover 47 with which part of an upper vapor supply hole 34E can be covered and a drive shaft 48 fixed on the cover 47.

When the drive shaft 48 is operated to move the slide-type cover 47 to the left or right in the drawing, a starting line 35A of the upper vapor supply hole 34E is displaced to the left or right in the drawing. As a result, each soldering process can be carried out under the optimum conditions in accordance with an arrangement of the article 16.

What is claimed is:

1. A vapor reflow type soldering apparatus comprising:
   a vapor generating tank means for heating a thermal medium to generate a vapor thereof;
   a conveyor means for delivering an article to be processed while passing through said vapor generating tank means;
   a lower vapor supply hole means for introducing the thermal medium vapor generated in said vapor generating tank means to a lower surface of the article; and
   an upper vapor supply hole means for introducing the thermal medium vapor to an upper surface of the article at a position displaced in a direction of delivery of said conveyor means with respect to said lower vapor supply hole means for raising a temperature of the upper surface of the article more moderately than a temperature of a lower surface of the article.

2. A vapor reflow type soldering apparatus comprising:
   a vapor generating tank means for heating a thermal medium to generate a vapor thereof;
   a conveyor means for delivering an article to be processed while passing through said vapor generating tank means;
   a lower vapor supply hole means for introducing the thermal medium vapor generated in said vapor generating tank means to a lower surface of the article to be processed; and
   an upper vapor supply hole means for introducing the thermal medium vapor to an upper surface of the article at a position relatively displaced in a direction of delivery of said conveyor means with respect to said lower vapor supply hole means to raise a temperature of the upper surface of the article more moderately than a temperature of a lower surface thereof, said upper vapor supply hole means being provided with flow controlling members by which a flow direction of the thermal medium vapor supplied to the article to be processed is inclined to said direction of delivery of the conveyor means rather than a direction perpendicular to said direction of delivery.

3. A vapor reflow type soldering apparatus comprising:
   a vapor generating tank means for heating a thermal medium to generate a vapor thereof;
   a conveyor means for delivering an article to be processed while passing through said vapor generating tank means;
   a lower vapor supply hole means for introducing the thermal medium vapor generated in said vapor generating tank means to a lower surface of the article to be processed; and
   an upper vapor supply hole means for introducing the thermal medium vapor to an upper surface of the article at a position relatively displaced in a direction of delivery of said conveyor means with respect to said lower vapor supply hole means to raise a temperature of the upper surface of the article more moderately than a temperature of a lower surface thereof, said upper vapor supply hole means is provided with an openable/closable cover by which a low rate of the thermal medium vapor supplied to the article to be processed can be controlled.

4. A vapor reflow type soldering apparatus comprising:
   a vapor generating tank means for heating a thermal medium to generate a vapor thereof;
   a conveyor means for delivering an article to be processed while passing through said vapor generating tank means;
   a lower vapor supply hole means for introducing the thermal medium vapor generated in said vapor generating tank means to a lower surface of the article to be processed; and an upper vapor supply hole means for introducing the thermal medium vapor to an upper surface of the article at a position relatively displaced in a direction of delivery of said conveyor means with respect to said lower vapor supply hole means to raise a temperature of the upper surface of the article more moderately than a temperature of a lower surface thereof, said upper vapor supply hole means is arranged to change a position of an upstream end thereof with respect to said direction of delivery of the conveyor means so as to control the position of the article to be processed which is delivered by said conveyor means where the upper surface of the article begins to be exposed to the thermal medium vapor supplied from said upper vapor supply hole means.

* * * * *